United States Patent [19]
Senft et al.

[11] Patent Number: 4,822,228
[45] Date of Patent: Apr. 18, 1989

[54] QUICK-ACTION CONNECTION FOR RETAINING AN INSERTION PART IN AN ORIFICE OF A CARRIER

[75] Inventors: Ernst Senft, Möglingen; Herbert Klemmer, Nürtingen; Nikolaus Schefscik, Schwaikheim, all of Fed. Rep. of Germany

[73] Assignee: Daimler-Benz Aktiengesellschaft, Fed. Rep. of Germany

[21] Appl. No.: 934,868

[22] Filed: Nov. 25, 1986

[30] Foreign Application Priority Data

Nov. 27, 1985 [DE] Fed. Rep. of Germany ....... 3541931

[51] Int. Cl.⁴ ............................................. F16B 21/18
[52] U.S. Cl. .................... 411/519; 411/913; 411/508; 403/326
[58] Field of Search .............. 411/519, 508–10, 411/913, 58; 403/326–328

[56] References Cited

U.S. PATENT DOCUMENTS

| | | |
|---|---|---|
| 3,527,120 | 9/1970 | Over et al. ................ 411/519 X |
| 3,528,313 | 9/1970 | Berno . | 
| 3,631,738 | 1/1972 | Harper ...................... 411/913 X |
| 3,708,850 | 1/1973 | Martin ...................... 403/326 X |
| 4,019,824 | 4/1977 | Percy ........................ 411/519 X |
| 4,364,427 | 12/1982 | Lefrancois ................. 411/508 X |
| 4,383,799 | 5/1983 | Okano et al. .............. 403/326 X |
| 4,481,702 | 11/1984 | Mitchell .................... 411/58 X |

FOREIGN PATENT DOCUMENTS 471336  2/1929  Fed. Rep. of Germany ........ 411/58
1457282 12/1976  United Kingdom .
2177771  1/1987  United Kingdom .

Primary Examiner—Lloyd A. Gall
Assistant Examiner—Curtis B. Brueske
Attorney, Agent, or Firm—Barnes & Thornburg

[57] ABSTRACT

In a quick-action connection for retaining an insertion part in an orifice of a carrier, for example a holding nipple in a body wall, there is, in a peripheral groove of a tenon-shaped extension piece of the insertion part, a retaining ring resiliently flexible in the radial direction, which has its largest diameter in the inserted state of the insertion part. The retaining ring partially projects beyond the periphery of the extension piece and is supported on the carrier by means of one of its end faces. So that the retaining ring is capable of guaranteeing a reliable mutual connection of the two parts, even when bending moments are exerted on the insertion part inserted into the carrier orifice with a clearance fit, its annular shell is closed in the peripheral direction and extends in the form of a meander. As a result of this ring design, the retaining ring can be compressed radially in order to introduce the insertion part into the carrier orifice, and after insertion it automatically springs open again. At the same time, by means of its continuously closed and therefore axially rigid annular shell, it is supported on the carrier on the one hand and on the insertion part on the other hand.

16 Claims, 2 Drawing Sheets

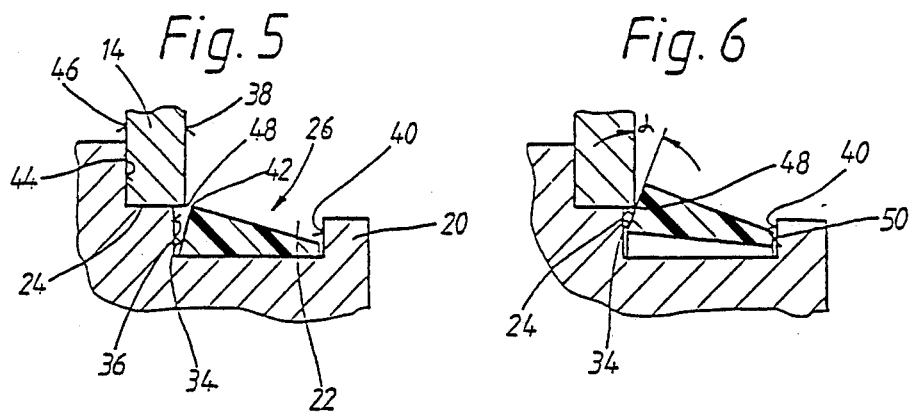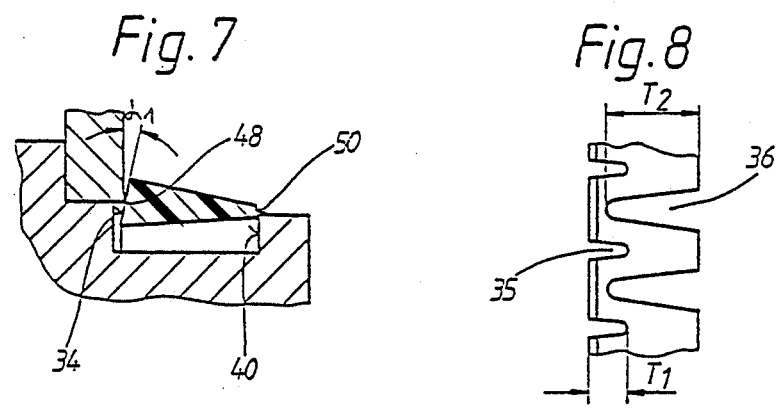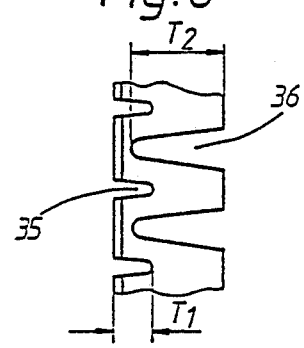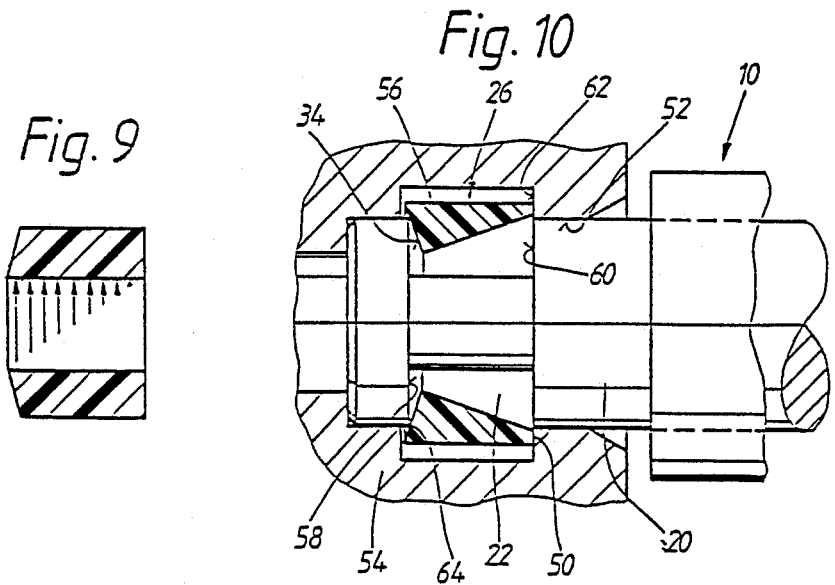

QUICK-ACTION CONNECTION FOR RETAINING AN INSERTION PART IN AN ORIFICE OF A CARRIER

BACKGROUND AND SUMMARY OF THE INVENTION

The invention relates to a quick-action connection for retaining an insertion part in an orifice of a carrier, especially for retaining a holding nipple receiving one end piece of a Bowden cable sleeve in a vehicle body wall. The insertion part can be inserted into the orifice by means of a tenon-shaped extension piece to a limited depth. The extension piece has a peripheral groove carrying a resiliently radially flexible retaining ring which is adapted to abuttingly engage the carrier adjacent the orifice by one of its end faces.

A quick-action connection of this type has been contemplated in vehicle-building, for example for mounting a holding nipple in the front end wall of the body of passenger cars.

The holding nipple receives one end piece of the sleeve of a Bowden cable, and the Bowden cable is guided axially through the holding nipple. The steel retaining ring held in the peripheral groove of the tenon-shaped nipple extension piece and securing the holding nipple axially in the end wall is slotted along a generatrix, so that it can be compressed in the radial direction when the nipple is mounted and, in the prestressed state, introduced, together with the nipple extension piece, into the particular end-wall orifice and pushed through this.

As soon as the portion of the nipple extension piece carrying the retaining ring emerges again on the side of the end wall located opposite the insertion side, the retaining ring springs open radially and is consequently located partially inside and partially outside the peripheral groove. At the same time, the retaining ring engages, by means of part of one of its annular end faces, over the adjacent edge of the insertion orifice present in the end wall and thus forms a stop which automatically secures the holding nipple axially in the wall orifice. The retaining ring thus allows blind mounting of the holding nipple which can be carried out quickly from one side of the end wall.

One disadvantage which has emerged in such a quick-action connection is that the nipple retaining means give way as soon as a bending moment is exerted on the holding nipple. The reasons for this is that, so that the nipple extension piece can be pushed through the end-wall orifice easily, it is arranged in the latter with a clearance fit, and the retaining ring, because of its slotting, is not capable of opposing an appropriate resistance moment to bending moments. In particular, the retaining ring is subjected to torsion of its peripheral part located opposite the ring slot, and its retaining effect then decreases sharply. Another disadvantage is that, because of the slotted annular shell, the radial expansion of the retaining ring on the periphery and consequently the support of the retaining ring against the end wall are uneven.

An object on which the invention is based is to provide a quick-action connection of the type mentioned above, the retaining ring of which performs its retaining function fully even under bending moments exerted on the insertion part, expands uniformly in the radial direction over its entire periphery when it is relieved of stress or springs open, and consequently provides a correspondingly favorable supporting base for the insertion part of the carrier.

According to the invention, this object is achieved by constructing the retaining ring shell to be closed in the peripheral direction and to be configured in the form of a meander by forming slots extending from the end faces of the ring in the axial direction along a portion of the length of the ring.

The annular shell closed in the peripheral direction and extending in the form of a meander makes it possible to obtain a design of the retaining ring which is flexible in the radial direction, so that the latter can be compressed radially during the assembly of the insertion part, in order to introduce its tenon-shaped extension piece into the particular carrier orifice.

When the retaining ring prestressed in this way then comes free of the periphery of the carrier orifice again during assembly, it springs open to a larger diameter, if appropriate to its original diameter, and in the axial direction provides, via its end faces, an essentially rigid support which is uniform over the entire ring periphery.

At the same time, because of the annular shell closed in the peripheral direction, the restoring forces exerted in the radial direction are equal over the entire ring periphery, and, depending on the shape of the meander design, a desired spring behavior when the retaining ring springs open can be achieved.

In a design of the retaining ring according to one preferred embodiment having slots of equal length extending from both end faces, a uniform restoring stress can be obtained in the radial direction over the rings entire shell length.

In a ring designed according to another preferred embodiment, the slots extend an unequal length from the respective ring end faces. With this design an asymmetric stress behavior can be obtained deliberately in the radial direction.

In preferred advantageous embodiments the slot-like recesses have a decreasing peripheral width in the direction away from their openings at one of the respective ring end faces.

In particularly advantageous designs the retaining rings are constructed of concial shape with the insertion end having the minimum diameter. With this design it is simple to insert the retaining ring into the carrier orifice.

In especially preferred embodiments, the annular end face of the retaining ring which faces the carrier wall when inserted is tapered conically inwards. In this case, the depth of insertion of the insertion part into the carrier orifice and the width of the peripheral groove on the extension piece of the insertion part can be coordinated with one another, in such a way that the conical annular end face of the not completely expanded retaining ring is supported merely on the peripheral edge of the carrier orifice or the groove wall of the peripheral groove adjacent to it.

As a result of the radial ring prestress still effective, a wedge effect and therefore at the same time a tolerance compensation are in this case achieved between the annular end face and the respective peripheral edge, so that a play-free and suitably sealed axial retention of the insertion part of the carrier orifice is guaranteed.

Other objects, advantages and novel features of the present invention will become apparent from the following detailed description of the invention when considered in conjunction with the accompanying drawings.

BRIEF DESCRIPTION OF THE DRAWINGS

FIG. 5 to 7 schematically illustrate the mode of operation of the retaining ring of the embodiment of FIGS. 1–4;

FIG. 8 is a view, similar to that of FIG. 3, of a shell portion of a second exemplary embodiment of the retaining ring;

FIG. 9 is a longitudinal sectional view through a retaining ring designed according to the FIG. 8 embodiment, and FIG. 10 is a longitudinal sectional view of a further exemplary embodiment of a quick-action connection constructed in accordance with the present invention.

DETAILED DESCRIPTION OF THE DRAWINGS

Figure 1:
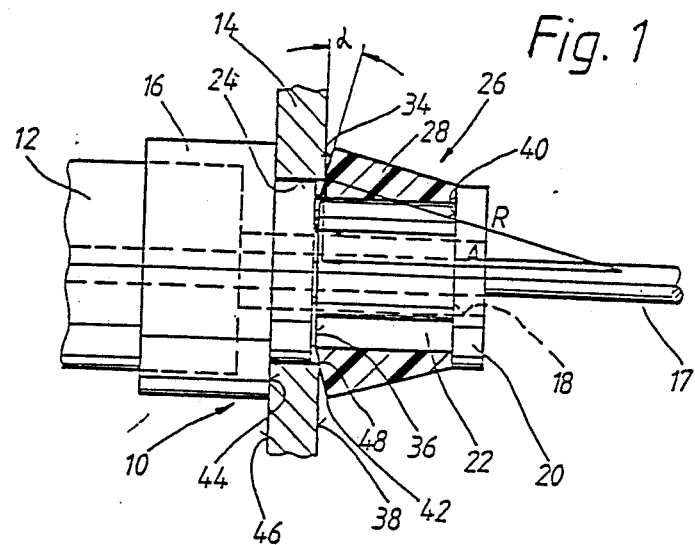
FIG. 1 is a longitudinal part sectional view of a quick-action connection for the blind fastening of a holding nipple, supporting the sleeve of a Bowden cable, in a body wall constructed in accordance with a first preferred embodiment of the invention.

The quick-action connection according to FIG. 1 serves to make it possible to mount a holding nipple 10 of a Bowden cable sleeve 12, for example in the front end wall 14 of a body of a passenger car from inside the body cell, or a so-called one-way blind mounting. The holding nipple 10 can also be mounted in another body part, for example in the tunnel wall of the body floor according to contemplated embodiments of the invention.

For this blind mounting purpose, the holding nipple 10 has a tenon-shaped extension piece 20 at the front end of its nipple part 16 receiving one end of the Bowden cable sleeve 12. The extension piece 20 includes an axial bore 18 penetrated by the Bowden cable 17 and a peripheral ring mounting groove 22.

By means of this extension piece 20, the holding nipple 10 can be inserted in a bore 24 in the end wall 14 so as to be slightly displaceable, until its nipple part 16 comes up against the inner face of the end wall 14 and its fastening position is thereby determined.

A retaining ring designated as a whole by reference numeral 26, inserted in to the peripheral groove 22 and resiliently flexible in the radial direction, serves for securing the holding nipple 10 in the end wall 14 in this position.

The inside and outside diameters of this retaining ring are coordinated with the diameter of the tenon-shaped extension piece 20 and with the depth of the peripheral groove 22 in such a way that the retaining ring 26, by being widened radially, can be pushed onto the tenon-shaped extension piece 20 and engaged with its peripheral groove 22 and, when the extension piece 20 is inserted into the bore 24, can be compressed radially in such a way that it can be pushed through the latter.

As shown in FIG. 1, the retaining ring 26 automatically resiliently returns to a larger diameter as a result of the radial prestress generated during its insertion, as soon as its annular shell 28 emerges from the bore 24 again during the introduction of the holding nipple 10. The retaining ring 26 has one axial end face 40 abutting the extension piece 20 and the other opposite axial end face extending at least partly radially outwardly of the extension piece 20 to engage the facing wall 14 and thereby axially fix the connecting piece in position at the wall.

The retaining ring 26 is advantageously injection-moulded from an elastic plastic. Accordingly, different materials can be used intentionally for the nipples and retaining rings.

Figure 2:
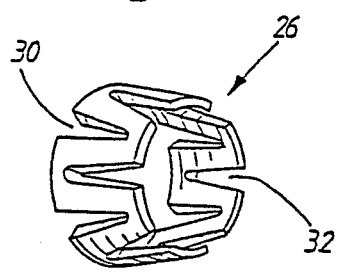
FIG. 2 is a diagrammatic oblique perspective view representation of the retaining ring of the quick-action connection of FIG. 1.

For the purpose of its radial flexibility, the annular ring shell 28 is made closed in the peripheral direction and is provided alternately with slot-like recesses 30 and 32 which extend respectively from one of its annular end faces in the direction of other annular end face and which terminate at a distance from same, with the result that the annular shell 28 acquires its meander shape in the peripheral direction (FIG. 2).

Figure 3:
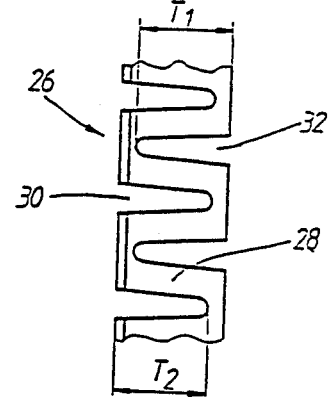
FIG. 3 is a flattened projection illustration of portion of the shell of the retaining ring of the quick-action connection of FIG. 1.

In the exemplary embodiment according to FIGS. 1 to 3, the recesses 30, 32 have a corresponding similar depth $T_1$ and $T_2$, and their width decreases towards their closed end.

When the retaining ring is of cylindrical design, it is necessary, when it is compressed radially, to overcome an equal expansion stress on it over its entire shell length. However, the stress behavior can be varied if, as shown in FIG. 8, the depth of the recesses 35, 36 accessible for the two annular end faces differs and, for example, the depth $T_1$ of the recesses 35 is less than the depth $T_2$ of the recesses 36. This is schematically illustrated in FIG. 9, where the intensity of the tension forces exerted is indicated by the length of the arrows and it can be seen that the annular shell 28 has its greatest radial rigidity over the region of the recesses 35 having the lesser depth $T_1$.

Furthermore, the radial rigidity or restoring stress can be adjusted appropriately over the entire length of the retaining ring by means of a design of the shell outer periphery which is conical in the direction of the one end face, specifically with recesses which are equal in depth according to FIG. 3 or unequal to depth according to FIG. 8.

The retaining ring 26 of the quick-action connection illustrated in FIG. 1 has a conicity on the outer periphery, specifically it tapers in the direction of insertion of the holding nipple 10, in such a way that, in the expanded state of the retaining ring 26, its end face having the smaller outside diameter does not project beyond the periphery of the extension piece 20. This conicity thus provides an insertion aid when the extension piece 20 is pushed through into the end wall 14. The retaining ring 26 is thereby compressed radially in a positive way. Moreover, as already explained above, the conicity gives rise to differing radial tension forces over the length of the annular shell, and this will be further discussed below.

Figure 4:
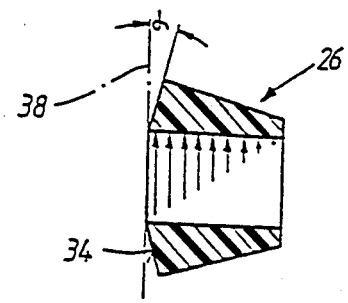
FIG. 4 is a longitudinal sectional view through the retaining ring according to FIG. 2, with schematically depicted radial restoring forces.

As can be seen from FIGS. 1 and 4, the end face of the retaining ring 26 facing towards the end wall 14 tapers conically towards its axis, so that its annular end face 34 forms an acute angle $\alpha$ with the radial groove wall 36, adjacent to it, of the peripheral groove 22 or with the radial outer end-wall face 38 facing towards it.

This conicity of the annular end face offers the substantial advantage of automatically compensating for existing tolerances in the distance between the outer end-wall face 38 and the radial groove wall 40 of the peripheral groove 22 located opposite it. A precondition for this is that the depth of insertion of the tenon-shaped extension piece 20 into the end wall 14 is such that, as can be seen clearly in FIGS. 5 to 7, the groove wall 36 of the peripheral groove 22 is located within the end-wall bore 24, the length dimension of the retaining ring 26 is coordinated with the width of the peripheral groove 22, so that, in its state completely pressed radially into the peripheral groove 22 (FIG. 5), in which the retaining ring, because of the meander shape of its annular shell, assumes its greatest length in the longitudinal direction, the latter corresponds essentially to the groove width, and the conicity of the annular end face facing the groove wall 36 is such that the outer peripheral edge 42 of the conical annular end face 34 is located outside the end-wall orifice 24.

When the holding nipple 10 is inserted into the end wall 14 up to an end position shown in FIGS. 1 and 5 to 7, in which a radial annular face 44 of the nipple part 16 rests against the inner end-wall face 46, the retaining ring 26, pressed completely into the peripheral groove 22 in the radial direction as a result of its peripheral conicity when the tenon-shaped nipple extension piece 20 is introduced into the bore 24, endeavours to spring open again automatically in the opposite radial direction as a result of the prestress generated thereby.

The asymmetric stress behavior imparted to the retaining ring 26 over its axial length as a result of the peripheral conicity (FIG. 4) ensures that the greater restoring tension is effective in the ring end piece facing the end wall 14. Consequently, the retaining ring springs open more sharply in the region of this ring end piece, the annular end face 34 coming up against the peripheral edge 48 of the end-wall orifice 24 (FIG. 6).

At the moment of contact between the retaining ring 26 and end wall 14, the remaining ring part can spring open even further, since there is no radial resistance, and during its expansion the angle α between the outer end-wall face 38 and the annular end face 34 necessarily decreases to $\alpha_1$ (FIG. 7).

In this radially restored state of the retaining ring 26, the latter is supported on the groove wall 40 of the nipple extension piece 20 by means of its annular end face 50 facing away from the end wall 14, and if appropriate it is not completely expanded to its unstressed state. The remaining ring 26 thereby ensures a play-free arrangement or bracing of the holding nipple 10 in the end wall 14.

FIG. 1 shows the tension forces F and A which ensure this nipple retention and are exerted by the retaining ring 26 and which act both radially and axially. Here, F represents the spring force acting in the radial direction and A represents the retaining force acting in the axial direction, these forces producing the effective force resultant R.

Whereas FIGS. 1 and 5 to 7 illustrate an outer quick-action connection, FIG. 10 shows an inner quick-action connection. Here, the tenon-shaped extension piece 20 of the holding nipple 10 can be automatically fixed free of play inside a bore 52 in a carrier, for example a body wall 54.

For this purpose, there is assigned to the peripheral groove 22 of the extension piece 20 in the bore 52 an inner peripheral groove 56 which is located in the region of the peripheral groove 22.

The width of the inner peripheral groove 56 is somewhat greater than that of the peripheral groove 22, and, when the holding nipple 10 is inserted, one radial groove wall 58 of the peripheral groove 22 is located within the inner peripheral groove 56, whilst the other two radial groove walls 60 and 62 are essentially in a common plane.

In this case, the retaining ring 26, in its restored or spring-open state, is supported on the peripheral edge 64 of the groove wall 58 by means of its conical annular end face 34, whilst its other annular end face 50 is supported on the groove wall 62 of the inner peripheral groove 56.

The two basic types of quick-action connections of FIGS. 1 and 10 are designed as unreleasable structures in the embodiments illustrated. They can just as easily be made releasable according to other contemplated embodiments of the invention. For this purpose, the conicity of the annular end face 34 must be selected so that the angle α is increased correspondingly. Furthermore, the peripheral edge 48 of the end-wall orifice 24 or the peripheral edge 64 of the groove wall 62 of the inner peripheral groove 56 must be rounded appropriately. These measures ensure that the quick-action connections can be locked and released again via a pressure point.

From the preceding description of the preferred embodiments, it is evident that the objects of the invention are attained, and although the invention has been described and illustrated in detail, it is to be clearly understood that the same is by way of illustration and example only and is not to be taken by way of limitation. The spirit and scope of the invention are to be limited only by the terms of the appended claims.

What is claimed is:

1. Quick-action connection for retaining an insertion part in an orifice of a carrier wall, such as for a Bowden cable sleeve at a vehicle wall, comprising:
   an extension piece having an annular peripheral groove bounded on one end by a radially protruding tenon part,
   and a retaining ring carried in the annular groove with a first end face facing the tenon part and a second oppositely facing end face, said retaining ring being resiliently flexible in the radial direction to accommodate insertion thereof through a carrier wall orifice and subsequent radial expansion, to a clamping position, with said second end face abutting the carrier wall adjacent the orifice and the first end face abutting the tenon part,
   wherein the retaining ring is a slotted meander-shaped ring with slot-like recesses extending axially from both axial ends of the retaining ring, said slot-like recesses and the wall thickness of the retaining ring being configured to provide different radial restoring forces at respective different axial locations of the retaining ring,
   wherein said retaining ring is conically tapered from a maximum diameter at its end facing the carrier wall when in an inserted position, and
   wherein the slot-like recesses at the end adjacent the maximum diameter of the retaining ring are axially shorter than are the slot-like recesses at the opposite end of the retaining ring.

2. Quick-action connection according to claim 1, wherein the width of the slot-like recesses of the retaining ring decrease towards their respective closed ends.

3. Quick action connection according to claim 1, wherein the second end face is conically tapered with respect to a longitudinal axis of the ring to accommodate deviations in the axial distance between the tenon part and the carrier wall while maintaining a resilient clamping in the axial direction.

4. Quick-action connection according to claim 1, wherein the retaining ring is formed of plastic.

5. Quick-action connection according to claim 1, wherein in the assembled state of the carrier wall and insertion part, one groove wall of the peripheral groove of said extension piece is located within the carrier orifice, and wherein an annular end face of the retaining ring which faces toward this groove wall forms an acute angle α with said groove wall and is supported on an adjacent peripheral edge of the carrier orifice.

6. Quick-action connection according to claim 1, wherein in the assembled state of the carrier and insertion part, the peripheral groove holding the retaining ring is located within the carrier orifice, wherein the carrier orifice has an inner peripheral groove in the region of the peripheral groove of the extension piece, and wherein the retaining ring, in the sprung-open state, is supported on the one hand by means of one annular end face on a peripheral edge of the peripheral groove of the extension piece and on the other hand by means of the other annular end face on a groove wall of the inner peripheral groove.

7. Quick-action connection for retaining an insertion part in an orifice of a carrier wall, such as for a Bowden cable sleeve at a vehicle wall, comprising:
an extension piece having an annular peripheral groove bounded on one end by a radially protruding tenon part,
and a retaining ring carried in the annular groove with a first end face facing the tenon part and a second oppositely facing end face, said retaining ring being resiliently flexible in the radial direction to accommodate insertion thereof through a carrier wall orifice and subsequent radial expansion, to a clamping position, with said second end face abutting the carrier wall adjacent the orifice and the first end face abutting the tenon part,
wherein the retaining ring is a slotted meander-shaped ring with slot-like recesses extending axially from both axial ends of the retaining ring, said slot-like recesses and the wall thickness of the retaining ring being configured to provide different radial restoring forces at respective different axial locations of the retaining ring, and
wherein said slot-like recesses at both axial ends of the retaining ring are of equal length, and wherein the wall thickness of the retaining ring is varied along its axial length to provide the different radial restoring forces.

8. Quick-action connection according to claim 1, wherein the width of the slot-like recesses of the retaining ring decrease towards their respective closed ends.

9. Quick-action connection according to claim 7, wherein the retaining ring tapers conically in the direction of insertion of the insertion part with minimum wall thickness adjacent said first end face.

10. Quick-action connection according to claim 7, wherein the retaining ring is formed of plastic.

11. Quick-action connection according to claim 7, wherein in the assembled state of the carrier wall and insertion part, one groove wall of the peripheral groove of said extension piece is located within the carrier orifice, and wherein an annular end face of the retaining ring which faces towards this groove wall forms an acute angle α with said groove wall and is supported on an adjacent peripheral edge of the carrier orifice.

12. Quick-action connection according to claim 7, wherein in the assembled state of the carrier and insertion part, the peripheral groove holding the retaining ring is located within the carrier orifice, wherein the carrier orifice has an inner peripheral groove in the region of the peripheral groove of the extension piece, and wherein the retaining ring, in the sprung-open state, is supported on the one hand by means of one annular end face on a peripheral edge of the peripheral groove of the extension piece and on the other hand by means of the other annular end face on a groove wall of the inner peripheral groove.

13. Quick-action connection according to claim 7, wherein said retaining ring is conically tapered from a maximum diameter at its end facing the carrier wall when in an inserted position.

14. Quick-action connection according to claim 13, wherein at least the slot-like recesses extending from the minimum diameter end of the the retaining ring extend at least one-half the length of the retaining ring.

15. Quick-action connection according to claim 13, wherein the slot-like recesses are configured to assure greater radial restoring forces at the maximum diameter end of the retaining ring, with decreasing radial restoring forces on the region of the other end.

16. Quick action connection according to claim 7, wherein the second end face is conically tapered with respect to a longitudinal axis of the ring to accommodate deviations in the axial distance between the tenon part and the carrier wall while maintaining a resilient clamping in the axial direction.

* * * * *